(12) United States Patent
Celedon et al.

(10) Patent No.: US 7,050,803 B2
(45) Date of Patent: May 23, 2006

(54) METHOD AND SYSTEM FOR OPTIMIZING CELL-NEIGHBOR LISTS

(75) Inventors: Rafael Celedon, San Bruno, CA (US); Ali Shah, Plano, TX (US); Julio Velo, Plano, TX (US); Dwight Inman, Allen, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 365 days.

(21) Appl. No.: 10/336,500

(22) Filed: Jan. 3, 2003

(65) Prior Publication Data
US 2003/0190916 A1    Oct. 9, 2003

Related U.S. Application Data

(60) Provisional application No. 60/370,476, filed on Apr. 5, 2002.

(51) Int. Cl.
*H04Q 7/20* (2006.01)
(52) U.S. Cl. ............ 455/436; 455/437; 455/438
(58) Field of Classification Search ........... 455/436, 455/437, 438
See application file for complete search history.

(56) References Cited

U.S. PATENT DOCUMENTS

| | | | |
|---|---|---|---|
| 5,499,386 A * | 3/1996 | Karlsson | 455/444 |
| 5,839,070 A | 11/1998 | Brunner et al. | |
| 5,915,221 A | 6/1999 | Beliveau et al. | |
| 6,119,005 A * | 9/2000 | Smolik | 455/436 |
| 6,188,904 B1 | 2/2001 | Marsan | |

FOREIGN PATENT DOCUMENTS

WO    WO 97 32445 A    9/1997

* cited by examiner

*Primary Examiner*—George Eng
*Assistant Examiner*—Julie E Stein

(57) ABSTRACT

A count is made of the number of mobile assisted handoff (MAHO) attempts between a service cell and a targeted cell. A count is also made of the number of times the targeted cell is considered a Best Candidate (BestCand) for handoff from the service cell. If the targeted cell is not included in the service cell's neighbor list, a potential neighbor cell (PNC), hysteresis is added to the targeted cell to prevent handoffs to the targeted cell. The MAHO and BestCand counts are determined and if the counts meet or exceed predetermined threshold values the targeted cell is added to the list. If the targeted cell is on the neighbor list, no hysteresis is added. If the count data does not meet or exceed the threshold values, the target is removed from the list

18 Claims, 4 Drawing Sheets

METHOD AND SYSTEM FOR OPTIMIZING CELL-NEIGHBOR LISTS

CLAIM OF PRIORITY UNDER 35 USC 119

Priority is hereby claimed under 35 USC 119(e) to Provisional Application Ser. No. 60/370,476 filed on Apr. 5, 2002.

BACKGROUND OF THE INVENTION

1. Technical Field of the Invention

The present invention relates to digital wireless communication systems. More particularly, the present invention relates to neighboring cells within a digital wireless communication system. Even more particularly, the present invention relates to managing neighbor-cell lists within the digital wireless communication system.

2. Description of Related Art

In cellular mobile communication systems, a mobile handset communicates with base transceiver stations ("BTS's") positioned throughout a geographic area. Each BTS broadcasts on a discrete radio channel within a specified coverage area. A multiplicity of BTS sites may produce an array of cells that allows the system to provide radio coverage over a wide geographic area.

During a call, the user of a mobile handset will often move between neighboring cells within the system. As the mobile handset moves from one cell to a neighboring cell, the base station controller ("BSC") of the serving cell typically transfers the call session to the BTS of the neighboring cell. This transfer of the call is termed "handoff."

In digital cellular communication systems, such as those utilizing TDMA or CDMA signal transmission protocols, communications between multiple BTS sites and mobile handsets are carried out on radio frequency channels that can carry simultaneous communications. Using these digital protocols, communication sessions are typically performed using digitized voice or data signals that are transmitted as coded bursts or bursts within specified time slots. The coded bursts or time slots corresponding to multiple communication sessions are multiplexed onto the radio channels of the respective cells, and each mobile handset reads and communicates on an assigned decoded channels or assigned time slots on sending and receiving channels. Handoff in digital systems is typically performed using measurements from the mobile handset itself. Known as mobile-assisted handoff ("MAHO"), the method utilizes the mobile handset to periodically monitor and measure radio signals of neighboring BTS sites.

In Global System for Mobile communications (GSM), the mobile station monitors a neighbor cell's Absolute Radio Frequency Channel number (ARFCN) and does calculations for the neighbor cell and the serving cell. The ARFCN's are stored in a Broadcast Control Channel Allocation (BA) list that is broadcast to the mobile station in the idle and dedicated modes. The list of neighbors that the mobile handset measures on a periodic basis is typically contained in a "neighbor-cell list" (hereinafter neighbor list) of the wireless cell that is serving (service cell) the handset. The list may be kept on a database maintained at the site of the serving BTS, retained at a radio network controller ("RNC") site controlling a plurality of BTS's, or at a centralized mobile switching center ("MSC"). In order to compare measured signals from the neighbor-cells on the neighbor list with the measured signal from the serving cell, the mobile station transmits the results of its measurements to the serving BTS. The serving BTS will in turn forward the measurements to either the applicable RNC's or to the MSC. If the received signal strength of the current channel in the serving cell falls below a threshold or is otherwise lower than the signal strength of a measured channel of a neighboring cell, the MSC or RNC may initiate handoff of the mobile handset's call session to a neighboring cell. Each cell includes an associated neighbor list that includes information on which BSC controls the neighboring cell.

Large neighbor lists in a cellular network result in a large number of handoff candidates. These lists can lead to excessive handoff problems, since the handoff candidates are in the neighbor list, such as dropped calls and loss in overall quality of the cellular network. Excessively large neighbor lists pose a frequency-planning problem as it becomes more difficult to identify available frequencies for neighboring cells without violating frequency-planning constraints.

As a part of preparing the network for an optimum use of cells and frequencies, neighbor lists need to be optimized, i.e., identify and remove unnecessary neighbor-cells. On the other hand, necessary handoff neighbors need to be determined and kept or added to the neighbor list. A current method, well known to those skilled in the art, utilizes peg counters to compute the number of times a handoff occurs between a cell-neighbor-cell (CELL-NCELL) pair. Network planners use this information to determine changes or additions to the system. In many systems facilities for such peg counters do not exist due to the fact that they are memory intensive. For example, in a system with 500 cells, 4000 CELL-NCELL neighbor-cell relationships may exist and a peg counter for each relationship implies 4000 peg counters with memory for each counter. Another drawback to the peg counter method is that the peg counter method cannot be used to identify new neighbor possibilities.

Therefore, It would be advantageous to have a method of optimizing neighbor lists by automatically removing and adding cells to overcome the disadvantages of the existing solutions. The present invention provides such a system and method.

SUMMARY OF THE INVENTION

It is one object of the present invention to provide a method and system for optimizing the number of cells in a neighbor list.

It is a further object of the present invention to provide a method and system for adding a cell to a neighbor list.

A neighbor list in a cellular telecommunications network may be modified by selecting a cell-neighbor-cell pair for consideration. Mobile assisted handoff count data and best candidate count data are analyzed and compared against a predetermined threshold values. If the count data is less than the threshold, the neighbor-cell is removed from the neighbor list. The process is repeated until all the cells in the neighbor list have been screened. As new cells are added, the process is repeated.

A potential neighbor-cell may be added to a neighbor list by adding a hysteresis value to the potential neighbor-cell and then adding the potential neighbor-cell to the neighbor list of a service cell. The added hysteresis value is large enough to prevent handoff between the service cell and the potential neighbor-cell which will allow normal operation without a mobile station actually accessing the potential neighbor cell. Mobile assisted handoff count data (potential) and best candidate count data (potential) is then gathered and analyzed even though no handoffs take place between the service cell and the potential neighbor-cell. If the data exceeds a predetermined threshold value, the cell is added to the neighbor list. The process is repeated for each potential neighbor-cell.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF A PREFERRED EMBODIMENT

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from theses specific details. In other instances detailed descriptions of well-known devices, circuit, and methods are omitted so as not to obscure the description of the present invention with unnecessary detail.

Figure 1:
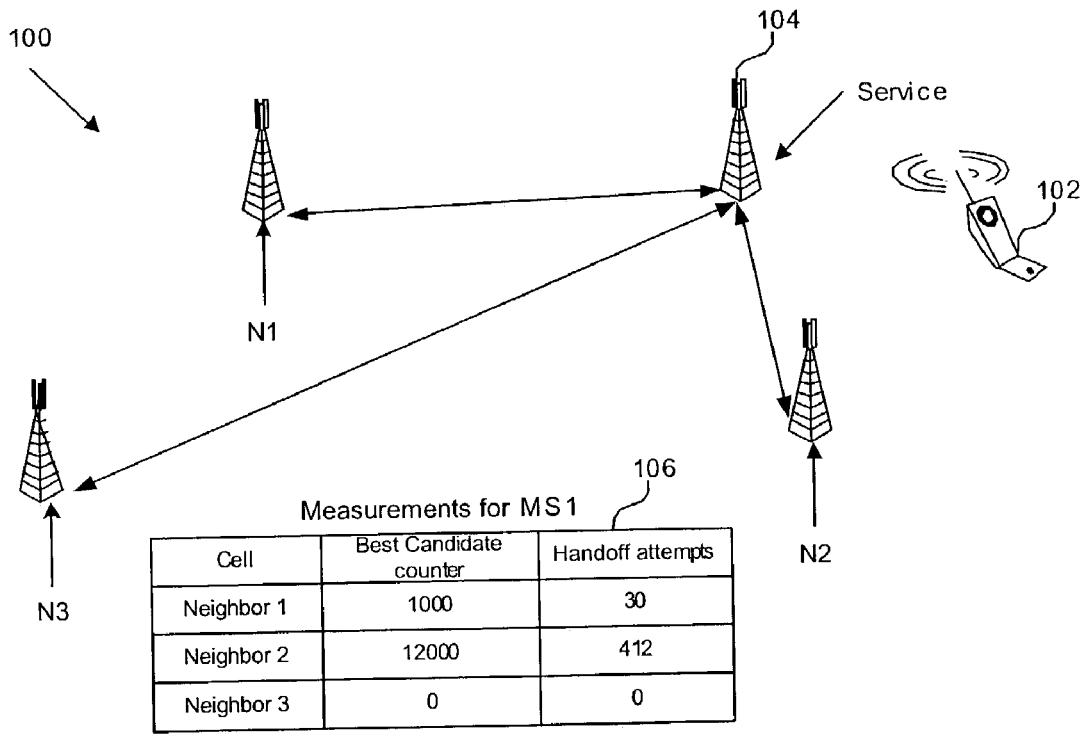
FIG. 1 depicts a high level diagram of a network in which a neighbor-cell is considered for removal from a neighbor list, in accordance with a preferred embodiment of the present invention.

FIG. 1 depicts a high level diagram of a telecommunications network in which a preferred embodiment of the present invention may be implemented, wherein a neighbor-cell is to be considered for removal. Included in the network, though not shown, is an operational support system (OSS) that is a set of programs to provide, among other functions, control and analyzing functions. The OSS creates commands to act (remove or add) on target cells in a mobile service center (MSC). Network 100 includes Mobile Station (MS) 102 that is in communication with service cell 104. Network 100 includes Neighbor-cells (Ncell) N1, N2, and N3. As one skilled in the art might conclude, there are more than three neighbor-cells in a typical wireless network. FIG. 1 is limited to three Ncells to simplify explanation and illustration of the present invention. Table 112 comprises measurements that are collected in cellular systems. The present invention optimizes a neighbor list for a particular cell in a cellular telecommunications network by automatically removing unnecessary cells and adding necessary neighbor-cells to the cell's neighbor list when warranted. Generally, measurements are stored and available in an MSC to use in determining the necessity for removing or adding a particular cell in a neighbor list.

High-level block diagram 110 depicts gathering statistics related to handoff attempts (MAHO data) at individual cells, and the number of times a neighbor-cell is determined to be a best candidate (BestCand data). The variable x in diagram 110 represents MAHO data and the variable y represents BestCand data. Each neighbor-cell (Ncell(1), Ncell(2), . . . Ncell(n)) provides x and y values for the neighbor list of cell i (in this example, cell A equates to service cell 104).

FIG. 1 shows two Ncells; N(1) and N(2) in reasonably close proximity to service cell 104. Ncell N(3) is also included in service cell's 104 neighbor list. Due to measurement data, as depicted in table 106, Ncell N(3) is a candidate for removal from service cell's 104 neighbor list. Table 106 displays example data retrieved from a Best Candidate (BestCand) counter and a Handoff (Hoff) attempts counter connected with each Ncell. BestCand data identifies a cell with a Radio Signal Strength Indicator (RSSI) that is at or above a predetermined threshold. In other words, even though a cell is included in a neighbor list, the cell may not be considered a BestCand if the RSSI is below a certain level.

The variable $x_k$ ($k=1, 2, 3, \ldots, n$) represents the number of times neighbor-cell "k" was the best handoff candidate according to the MAHO measurements. The total number of Handoff attempts for cell A is:

$$HoffTotal = x1 + x2 + x3 + \ldots + xn$$

$$Hoff1\% = (x1/HoffTotal)*100\%$$

$$Hoff2\% = (x2/HoffTotal)*100\%. \ldots$$

$$Hoffn\% = (xn/HoffTotal)*100\%$$

In this case, call data information (indicating actual peg counts) can be collected relatively infrequently (e.g., once every "m" handoffs, where m~10). This information is correlated with the handoff data:

$$BestCandTotal = y1 + y2 + y3 + \ldots + yn$$

$$BestCand1\% = (y1/BestCandTotal)*100\%$$

$$BestCand2\% = (y2/BestCandTotal)*100\%. \ldots$$

$$BestCandn\% = (yn/BestCandTotal)*100\%.$$

The OSS then uses the data information to select a target cell for removal following which, the target cell is removed from the service cell 104 neighbor list.

Figure 2:
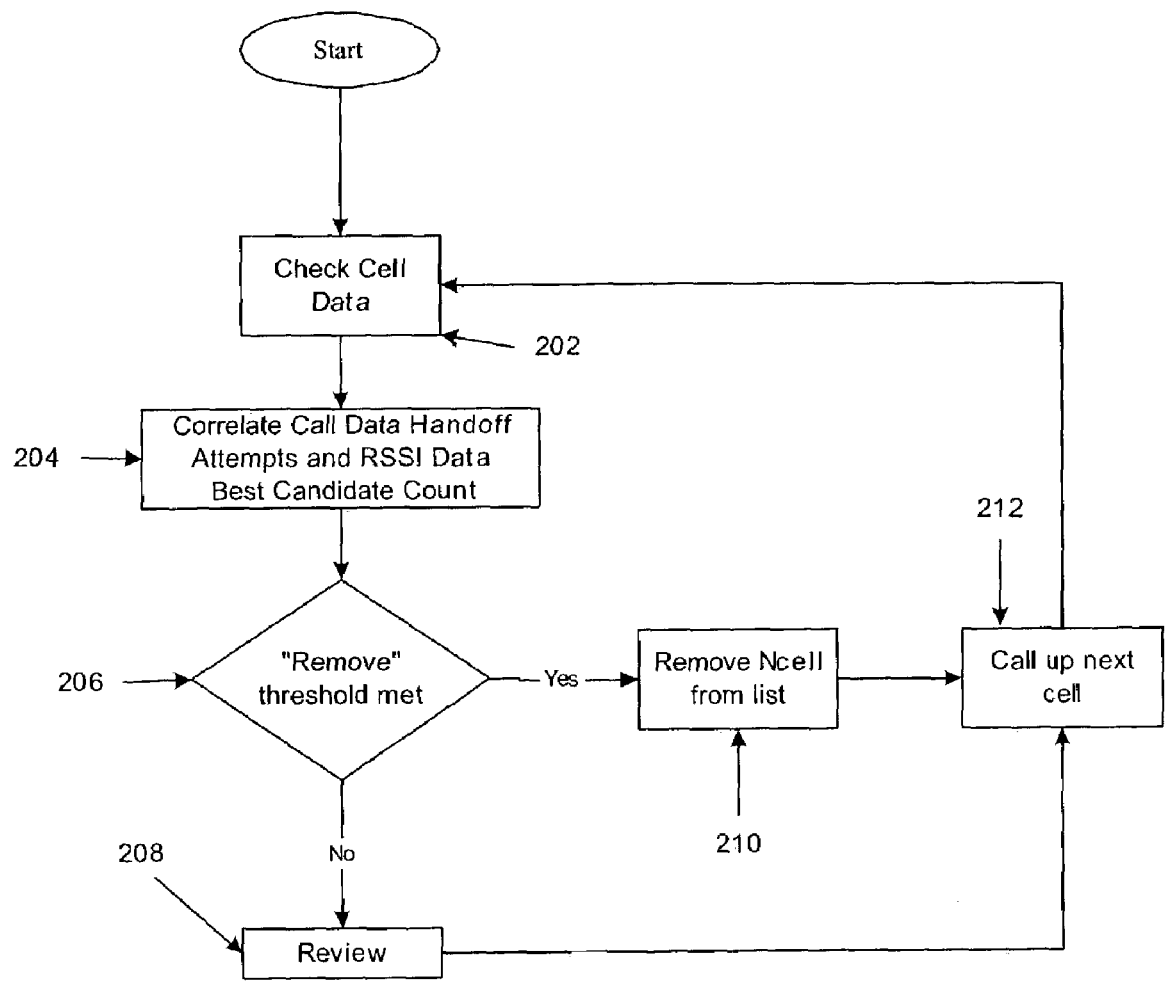
FIG. 2 depicts a method for identifying cells that are to be removed or restricted from a neighbor list, according to a preferred embodiment of the present invention

FIG. 2 is a high-level flow diagram depicting in a preferred embodiment of the present invention a method for identifying cells that should be removed or restricted from neighbor lists. FIG. 1 should be referred to in conjunction with the explanation of FIG. 2. The process begins with step 202, which depicts mobile station 104 checking cell data, i.e., the service cell's neighbor list, for potential neighbor-cells to which the mobile station may be handed off. The process continues to step 204, which illustrates correlating the MAHO attempts and BestCand count data of a target cell in the service cell's 104 neighbor list. Table 1 below provides example thresholds to which the attempts and counts are compared to determine the target cell's status.

The process proceeds to step 206, which depicts a determination of whether the data meets predetermined threshold values. In Table 1, the threshold values of MAHO attempts and BestCand count are shown to be five percent (5%). The criteria of 0% to 5% is merely used here for illustrative purposes. Those skilled in the art are aware that threshold values may be adjusted. If the handoff attempts and the BestCand counts consistently fall between zero and five percent, there may be a question of the Handoff definition. The RF engineers responsible for adjusting the service area may review the definition of the threshold values to more closely define the parameters or the cell may be removed from the neighbor list.

If both the Handoff attempts and the Best candidate count is zero, no handoffs occur because the RSSI is not strong enough and the cell was never a best candidate (in FIG. 1, N3 would likely never be a best candidate)

If the determination is made that the cell meets the "remove" threshold value (less than 5%), the process then proceeds to step 210, which depicts removal of the Ncell from the neighbor list. Both the Best candidate counter and the Handoff attempts counter must meet or exceed the threshold value in order for the Ncell to remain on the neighbor list without review. If the threshold values are 0% the target Ncell is removed from the neighbor list. When the counts fall between 0% and 5% the RF engineers will review the cell data before removal.

The process then passes to step 212, which illustrates beginning the cell data check of another Ncell in the neighbor list.

Returning to step 206, if the determination is made that the count data falls between 0% and 5%, the process proceeds to step 208. In this instance, the definition of the threshold values are reviewed and adjusted as necessary. The process then passes to step 212 where the threshold values are checked against another cell in the neighbor list.

The threshold values are developed for each cell-site at the RF Engineer's discretion as parameters can vary from cell-site to cell-site. Some choices of the thresholds are mentioned in the following table. But these thresholds are variable and can be changed.

fact that the neighbor-cell has been classed as "non-preferred" as a neighbor-cell. Another possible reason could be congestion in the neighbor-cell, which prevents handoffs to the neighbor cell.

Figure 3:
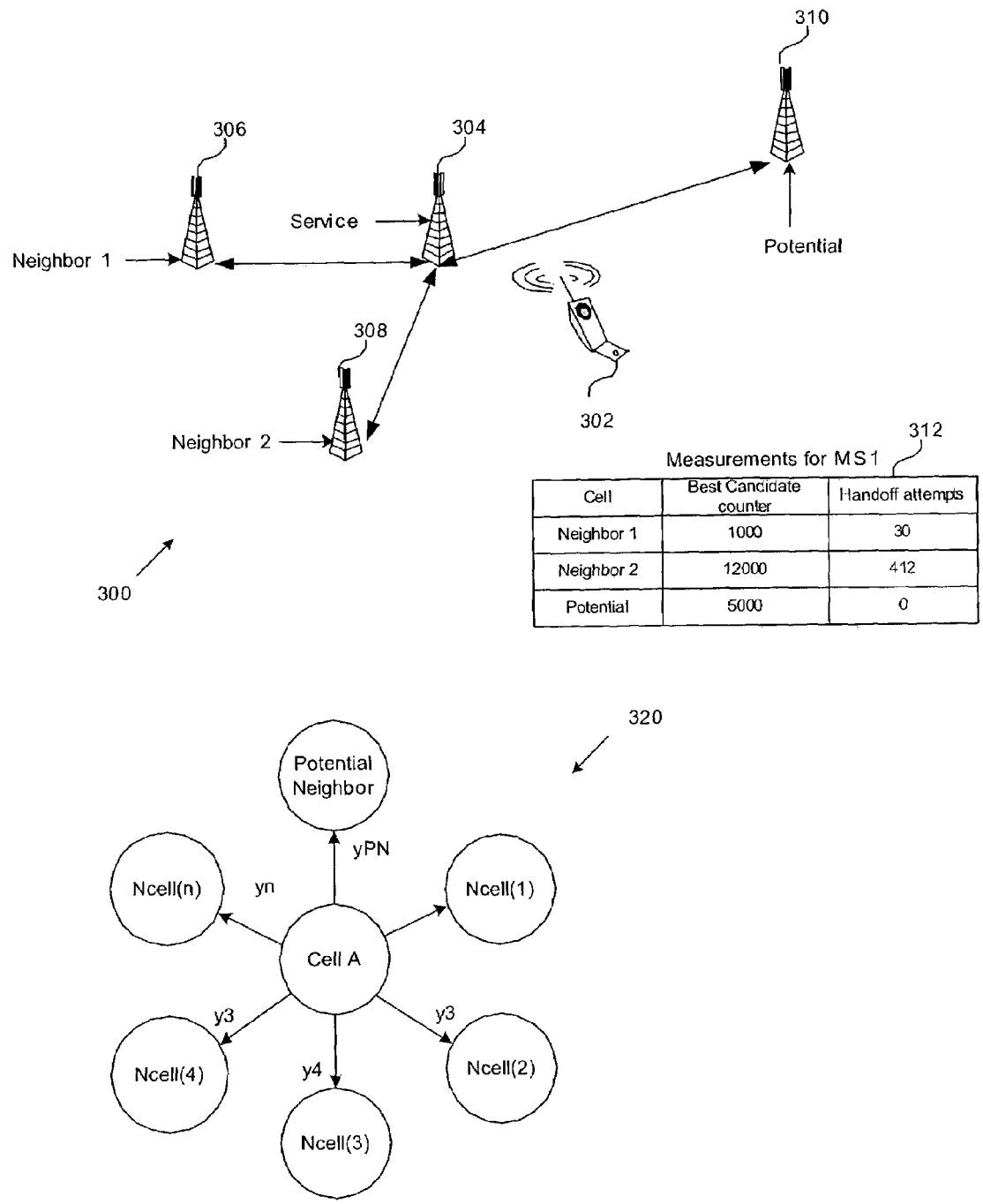
FIG. 3 is a high level diagram of a network in which a neighbor-cell is considered for addition to a neighbor list, according to a preferred embodiment of the present invention.

Though the processes are depicted as separate, both processes can be combined in the OSS to provide a process that is continually evaluating, for removal or addition, each cell associated with a particular service cell. FIG. 3 is a high level diagram of a network in which a neighbor-cell is considered for addition to a neighbor list, according to a preferred embodiment of the present invention. Accordingly, a new cell-neighbor-cell definition may be created for a potential neighbor-cell candidate. Network 300 comprises mobile station 302, cell 306 and 308 which are included in the neighbor list of service cell 304, and cell 310, a potential addition to the neighbor list. Table 312 depicts example measurements received by mobile station 302 which include best candidate counts and handoff attempts to the various cells within network 300.

Initially, the effort to determine a new handoff neighbor for service cell 304 begins with a search for cells that could be, but are not currently, part of the neighbor list for cell 304. Potential neighbor-cell candidate, cell 310 is initially added to the neighbor list of cell 304. A cell-neighbor-cell definition is created for cell 310. In the definition of the cell-neighbor-cell pair, a relatively high value of hysteresis is added or a Hierarchical Cell Structure (HCS)/non-preferred definition is included in the definition. Use of HCS is available in many cellular systems to allow a "sufficient candidate" and not the "best candidate" to be the preferred choice for a handoff. These neighbor definitions with such

TABLE 1

Conditions to remove/keep/check Ncell definitions

| HANDOFF ATTEMPTS | BEST CANDIDATE COUNTER | EXPLANATION | ACTION |
|---|---|---|---|
| HoffTotal = 0 | BestCandTotal = 0 | The handoff never happened because the neighbor-cell never is the best handoff candidate | REMOVE |
| 0% < Hoffn % <= 5% | 0% < BestCand <= 5% | Handoff attempts and Best Candidate Counts are low. Handoff definition must be reviewed or be removed | REVIEW/REMOVE |
| 0% < Hoffn % <= 5% | BestCandTotal = 0 | No Best candidate statistics reported. Handoff attempts possibly due to Hierarchical Cell Structure defined. The handoff could be removed. | REVIEW/REMOVE |
| HoffTotal = 0 | 0% < BestCand <= 5% | Handoff not happened possible because the neighbors cell is congested or to Hierarchical Cell Structure defined. | REVIEW/FIX |
| Hoffn % > 5% | BestCand % > 5% | Digital Handoff Attempts and Best Candidates counts have a good behavior | KEEP |

If there is no count of the neighbor-cell as a best candidate for handoff but handoffs do occur, it implies that a Hierarchical Cell structure is implemented that includes the neighbor-cell. The neighbor-cell is possibly a "preferred" micro cell. Even though the cell never is the best candidate from an absolute signal strength point of view (a non-preferred vs. standard definition could also cause this), handoffs may continue to occur.

Similarly, numerous BestCand counts for a neighbor-cell may occur while Call Data measurements show that handoff to this neighbor-cell did not happen. This could be due to the features in place are typically excluded from the analysis of cell-neighbor-cell. The hysteresis is added to potential neighbor-cell 310 at a value that prevents handoff to cell 310. Hysteresis is a signal quality increment that is generally applied to a signal quality difference value so that unless signal quality in an adjacent base station is at least "x" amount greater than the presently serving base station, handoff does not occur. In a typical use, hysteresis prevents oscillating handoffs due to signal quality perturbations in which the mobile is repeatedly handed back and forth between two adjacent base stations. In the present invention, hysteresis is used to prevent handoff to a cell. Note that classifying the cell as HCS or adding a hysteresis value is not feasible in the "peg-counter method".

Statistics are collected as indicated in table 312. The best handoff candidates, using the MAHO measurements, are identified. According to the value of the hysteresis setting, the handoff to potential neighbor-cell, cell 310, is highly unlikely. However, a best candidate count indicates that neighbor-cell 310 would be a better candidate for handoff than neighbor-cell 306. According to Table 312, handoff attempts to cell 310 are zero. The added hysteresis value prevents the cell from even being considered for handoff. Similarly, statistics for each current (service) cell-neighbor-cell pair are obtained for the service cell.

High-level block diagram 320 depicts a target cell, Cell A, with neighbor-cells from Ncell(2) through Ncell(n) and a potential neighbor-cell. Statistics for best candidate and handoff attempts must be obtained for each cell-neighbor-cell pair in the group. The percentage of counts for Best Candidate for potential neighbor-cell 310, is calculated by the following equations:

$$BestCandTotal = yPN + y2 + y3 + \ldots + yn$$

$$BestCandPN\% = (yPN/BestCandTotal)*100\%$$

BestCandPN % represents the percentage of the Best Candidate Counter for each cell as compared to the total count for the list. In this example, the potential neighbor-cell 310 may be compared to the total count. The values obtained from the formulas are used to determine whether the potential neighbor-cell is added to cell 304's neighbor list.

Figure 4:
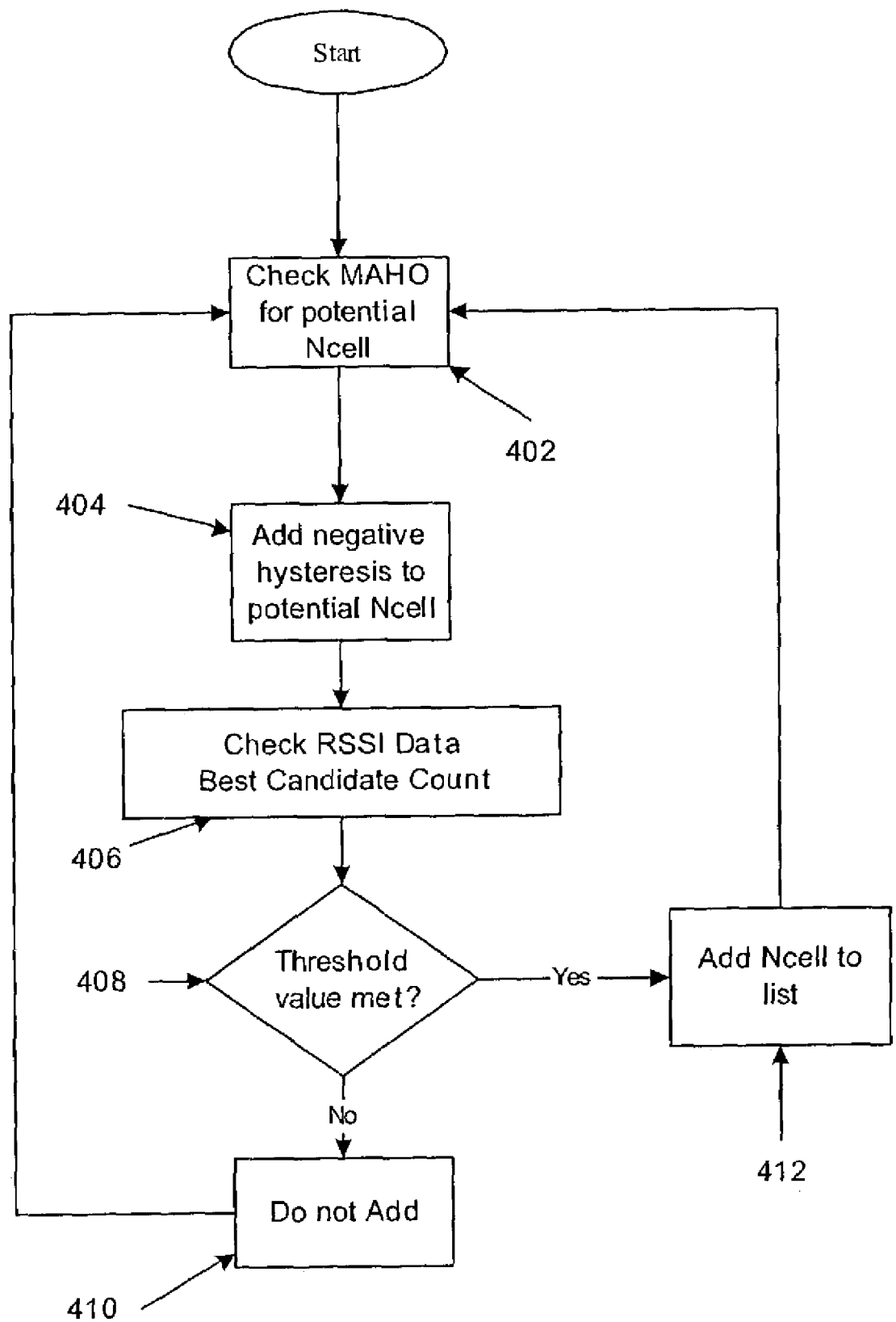
FIG. 4 illustrates a method for identifying cells to be added to a neighbor list in a preferred embodiment of the present invention.

FIG. 4 illustrates a method for identifying cells to be added to a neighbor list in a preferred embodiment of the present invention. FIG. 3 should be referred to in conjunction with the explanation of FIG. 4. Illustrative, predetermined criteria for adding or removing a cell from a neighbor list are shown in Table 2 below.

TABLE 2

Conditions to remove/add neighbor-cell

| BEST CANDIDATE | EXPLANATION | ACTION |
|---|---|---|
| 0% < BestCandPN <= 5% | The potential neighbor-cell does not present a good percentage for Best Candidate Counter to be added as neighbor-cell. | REMOVE |
| BestCandPN % > 5% | The potential neighbor-cell is a best candidate for Handoff enough times to be added as neighbor-cell | ADD |

Table 2 illustrates criteria for adding or refusing the addition of a cell when optimizing a neighbor list. Again the values are strictly for illustration and one skilled in the art would appreciate that actual values may be different. The criteria in Table 2 indicates that in order to add a potential neighbor-cell, the best candidate count must exceed 5% of the total best candidate counts for the entire neighbor list. The process begins with step 402, which depicts checking neighbor-cells for potential candidates for the neighbor list. The process continues to step 404, which illustrates adding hysteresis to the profile of the target candidate cell. By adding a sufficient value of hysteresis to the candidate cell, as explained previously, actual handoff is prevented. However, the handoff attempt is detected and recorded.

The process then passes to step 406, which depicts checking the RSSI data to determine the BestCand count for the candidate cell, cell 310. Table 312 indicates that the number of best candidate counts is 5000 and the total of best candidate counts is 18000 as between cells 306, 308 and 310. Utilizing the equation noted in the description of FIG. 3, the percentage of best candidate counts is 5000/18000*100%=27.8%. The process then proceeds to step 408, which illustrates a determination of whether the candidate cell's best candidate count exceeds the predetermined 5% threshold value for adding a cell to the neighbor list.

If the determination is made that the predetermined threshold value has been exceeded (in this illustration the threshold value has been exceeded at 27.8%), the process moves to step 412 and the candidate cell is added to the list. The process then proceeds to step 404 to process another potential neighbor-cell. Returning to step 408, if the determination is made that the best candidate count is less than the predetermined 5% threshold (i.e., the BestCand count of cell 310 is 1000 or 3.3%), the process continues to step 410, which illustrates forgoing addition of the potential neighbor-cell at this time. The process then returns to step 402 to check for another cell that may be included in the neighbor list.

Optimizing a neighbor list according to a preferred embodiment of the present invention is accomplished by automatically adding and removing cells to ensure that cells in the neighbor list are the cells that reduce the number of handoff problems, reduce the number of dropped calls and increase the call quality in the network. In summary, the method and system disclosed above optimizes a neighbor list and provides better frequency planning in the network. Removing a cell requires correlating RSSI (Best Candidate) and MAHO attempts counts to a predetermined threshold value. If the threshold value is exceeded the cell remains in the neighbor list. If the cell does not exceed the threshold value, the cell is considered for removal.

A cell may be added by initially including the potential neighbor-cell in the neighbor list. A hysteresis value is added to the cell profile to prevent handoffs to the cell, effectively making the cell unavailable to mobile stations. Best Candidate and MAHO attempts counts are determined as if the cell were available. If the cell exceeds the predetermined threshold value, the extra hysteresis is removed and the cell is added to the neighbor list. If the cell does not meet the threshold value, the cell is not added to the neighbor list. The process is automatically repeated in both the removal and addition of cells to the neighbor list.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. A method for adding a cell to a neighbor list comprising the steps of:
  a) selecting a potential neighbor-cell (PNC):
  b) adding a sufficiently high hysteresis value to said PNC to prevent any mobile station from handing off to said PNC:
  c) adding said PNC having said sufficiently high hystersis value to said neighbor list: and
  d) retrieving count data that establishes the number of times that said PNC having said sufficiently high hysteresis value receives a request for access and is considered a best candidate for adding to said neighbor list.

2. The method of claim 1 wherein said step of retrieving count data further comprises the step of counting the number of mobile assisted handoff attempts to said PNC having said sufficiently high hysteresis value.

3. The method of claim 2 further comprising the step of counting the number of times that said PNC having said sufficiently high hysteresis value is a best candidate for handoff.

4. The method of claim 1 further comprising the steps of:
   correlating said count data with predetermined threshold values; and
   adjusting said sufficiently high hysteresis value to a level that will allow mobile station handoff to said PNC having said sufficiently high hysteresis value if said best candidate count and mobile assisted handoff attempts data exceeds a predetermined set of threshold values.

5. A base station in a wireless telecommunications system, comprising:
   an operating support system (OSS) associated with said base station;
   a database associated with said OSS for storing count data associated with a potential neighbor-cell (PNC) wherein a sufficiently high hysteresis value to prevent mobile station handoffs is added to the PNC, wherein the PNC having the sufficiently high hysteresis value [and the PNC] is added to the neighbor list and count data comprises mobile assisted handoff (MHO) attempts and best candidate counts at said PNC having the sufficiently high hysteresis value;
   a receiver for receiving said count data from the mobile station (MS);
   a first counter for determining the number of times one of said cells in said telecommunications system is a best candidate for handoff between a service cell and said PNC having the sufficiently high hysteresis;
   a second counter for determining the number of mobile assisted handoff attempts between said service cell and said PNC having the sufficiently high hysteresis; and
   instructions within said OSS for one of removing said PNC having the sufficiently high hysteresis from the neighbor list if said count data does not correlate with a predetermined threshold and adding said potential neighbor-cell (PNC) to said neighbor list without the sufficiently high hysteresis value if said count data meets or exceeds said predetermined threshold value.

6. The base station of claim 5 wherein said OSS is capable of selecting a first potential neighbor-cell (PNC).

7. The base station of claim 5 wherein said database is commuicably coupled with a mobile switching center (MSC), said MSC being capable of processing and storing said count data in said database.

8. The base station of claim 5 wherein said count data is accumulated in said database according to a predetermined time period.

9. The base station of claim 5 wherein said OSS is capable of correlating said count data with said predetermined threshold value.

10. The base station of claim 5, wherein said OSS is further capable of selecting succeeding PNCs for addition to said neighbor list.

11. A method for modifying a neighbor list in a cellular telecommunications network, comprising the steps of:
   measuring data received from a mobile station;
   storing and processing said data; and
   adding potential neighbor-cells and removing neighbor-cells from said neighbor list wherein removing a neighbor-cell from said neighbor list comprises the steps of:
   a) selecting a neighbor-cell to pair with a service cell;
   b) counting the number of times that said neighbor-cell is a best candidate for handoff between said service cell and said neighbor-cell;
   c) counting the number of mobile assisted handoff (MAHO) attempts between said service cell and said neighbor-cell;
   d) analyzing the count data of said best candidate count and said MAHO attempts; and
   e) removing said neighbor-cell from said neighbor list if said count data does not meet or exceed a predetermined threshold value; and
   wherein adding a potential neighbor-cell (PNC) to said neighbor list comprises the steps of:
   a1) selecting a potential neighbor-cell (PNC) to said neighbor list;
   b1) applying a sufficiently high hysteresis value to said PNC to prevent the possibility of a mobile station handoff to said PNC;
   c1) adding said PNC having said sufficiently high hysteresis value to said neighbor list;
   d1) counting the number of mobile assisted handoff attempts on said PNC having said sufficiently high hysteresis value;
   e1) counting the number of times that said PNC having said sufficiently high hysteresis value is a best candidate for handoff;
   f1) analyzing the count data of said best candidate count and said mobile assisted handoff attempts; and
   g1) adjusting said sufficiently high hysteresis value to a level that will allow mobile station handoff to said PNC having said sufficiently high hysteresis value if said best candidate count data and said mobile assisted handoff attempts meet or exceed a predetermined set of threshold values.

12. The method of claim 11, further comprising the step of accumulating said best candidate count data in a database according to a preset time period.

13. The method of claim 12, further comprising the step of accumulating said MAHO attempts count data in said database according to said preset time period.

14. The method of claim 11, wherein the step of analyzing said best candidate count data and said MAHO attempts count data further comprises comparing said count data to a predetermined threshold value.

15. The method of claim 11, further comprising the step of selecting another cell in said neighbor list for removal and repeating steps a)–f).

16. The method of claim 15, further comprising repeating steps a1)–g1) for adding another PNC to said neighbor list.

17. The method of claim 11, wherein said step of counting the number of times that said neighbor-cell is a best candidate for handoff between said cell and neighbor-cell is performed by one of an originating base station and a mobile station.

18. The method of claim 11, wherein said step of applying a sufficiently high hysteresis value further comprises
   maintaining said sufficiently high hysteresis to prevent mobile station handoff to said PNC if said best candidate count data and said mobile assisted handoff attempts do not exceed a predetermined set of threshold values.

* * * * *